United States Patent [19]

Hartmann et al.

[11] 3,995,089

[45] Nov. 30, 1976

[54] MAGNETIC RECORDING MEDIA

[75] Inventors: Job Werner Hartmann, Ludwigshafen; Hans-Joerg Hartmann, Freinsheim; Dieter Mayer, Ludwigshafen; Peter Felleisen, Lampertheim; Ursula Klein; Herbert Motz, both of Ludwigshafen, all of Germany

[73] Assignee: Badische Anilin- & Soda-Fabrik Aktiengesellschaft, Ludwigshafen (Rhine), Germany

[22] Filed: Apr. 2, 1975

[21] Appl. No.: 564,473

Related U.S. Application Data

[63] Continuation of Ser. No. 367,329, June 6, 1973, abandoned.

[30] Foreign Application Priority Data

June 13, 1972 Germany............................ 2228643

[52] U.S. Cl................................ 428/336; 427/127; 428/148; 428/424; 428/900
[51] Int. Cl.$^2$.......................................... H01F 10/00
[58] Field of Search ............ 360/131, 134; 428/900, 428/402, 143, 147; 252/62.54; 427/127, 128

[56] References Cited

UNITED STATES PATENTS

| | | | |
|---|---|---|---|
| 2,804,401 | 8/1957 | Cousino............................. | 428/900 |
| 3,293,066 | 12/1966 | Haines............................... | 428/458 |
| 3,617,378 | 11/1971 | Beck.................................. | 428/336 |
| 3,687,725 | 8/1972 | Hartmann et al................... | 428/900 |
| 3,734,772 | 5/1973 | Shell et al.......................... | 428/148 |

*Primary Examiner*—George F. Lesmes
*Assistant Examiner*—R. J. Roche
*Attorney, Agent, or Firm*—Johnston, Keil, Thompson & Shurtleff

[57] ABSTRACT

A magnetic recording medium in the form of a card having a non-magnetic support with a magnetic coating on one side of the support and a backcoating on the opposite side of the support, which backcoating exhibits improved scratch resistance and adherence to the support and improved frictional characteristics and consists essentially of 20 to 50% by weight of a binder mixture containing 10 to 60% by weight of an elastomeric polyurethane and, incorporated in the binder mixture, a non-magnetic pulverulent mixture of 10 to 40% by weight of conductive carbon powder and 60 to 90% by weight of platelet-shaped and spherical particles.

5 Claims, No Drawings

MAGNETIC RECORDING MEDIA

This is a continuation, of application Ser. No. 367,329 filed June 6, 1973, now abandoned.

The present invention relates to magnetic recording media in card form comprising a flat non-magnetic support, a magnetic coating on one side of the support and a backcoating exhibiting improved scratch resistance and adhesion to the support and improved frictional characteristics on the other side of the support.

Magnetic recording media used for digital recording usually consist of a non-magnetic support such as a plastics film and a magnetic coating on one side of the support. It is known to provide the side of the support opposite the magnetic coating with a layer of a mixture of binder and particulate solids for the purpose of achieving specific effects associated with the use of the recording media. For example, German Patent 1,101,000 discloses a backcoating containing a specific amount of conductive particles such as carbon black for reducing the buildup of static electricity on magnetic recording media. In U.S. Pat. No. 3,293,066 a coating consisting of a polymeric binder and a mixture of particulate silica aerogel and conductive carbon is applied to the side of the support opposite the magnetic layer to reduce static electricity buildup and to raise the coefficient of friction of that side. A magnetic recording medium in the form of a card is disclosed in U.S. Pat. No. 3,617,378 which has a backcoating prepared from an organic polymer containing 4 to 50% by weight of conductive material in powder form and 8 to 40% by weight of non-magnetic $\alpha$-$Fe_2O_3$. Tests have shown that, in order for magnetic cards to operate satisfactorily in a handling device, the coefficient of friction between the back surface of a card and the magnetic surface of an adjacent card ($C_m$) must be less than 0.50, that the coefficient of friction between the high friction surface (rubber) of the card picker roll and the back of the card ($C_r$) must be 0.90 or more and that the coefficient of friction between the card transport surface and the back of the card ($C_s$) must be 0.35 or less. It is also known that magnetic cards work properly only if the resistivity of the backcoat is less than $5 \times 10^8$ ohms per square.

It is an object of the present invention to provide a magnetic card which meets the foregoing requirements.

It is a further object of the invention to provide a backcoating which exhibits better adhesion to the substrate and better scratch resistance than prior art backcoatings.

We have found that a magnetic card comprising a flat non-magnetic support (S), a magnetic coating (M) on one side of the support and a backcoating (B) comprising polymeric binder, conductive particles and non-magnetic pigments on the opposite side of the support has the desired properties when the backcoating (B) consists essentially of i. 20 to 50% by weight of a binder containing 10 to 60% by weight of an elastomeric polyurethane, and ii. a non-magnetic pulverulent mixture of 10 to 40 parts by weight of conductive carbon powder (a), 40 to 90 parts by weight of a mixture (b) of 20 to 45% by weight of kaolinite powder having platelet-shaped particles and 55 to 80% by weight of quartz powder having spherical particles, and optionally 5 to 40 parts by weight of corundum powder (c) having spherical particles.

Mixture (b) according to the invention preferably consists of 24 to 31% by weight of kaolinite powder having platelet-shaped particles and 69 to 76% by weight of quartz powder having spherical particles. Kaolinite powder whose particles in two dimensions are not larger than 20 $\mu$ and in the third dimension are from 0.01 to 0.03 $\mu$ is particularly suitable. The diameter of the spherical quartz particles is advantageously less than 25 $\mu$, preferably from 0.5 to 7 $\mu$. Suitable mixtures (b) are intimate mixtures of the kaolinite and quartz particles. The use of silicic powders which, by virtue of their origin and method of manufacture, are an intimate mixture of the kaolinite and quartz particles is very advantageous, for example a mixture of kaolinite and quartz particles having the structure of a loose layered arrangement and a density according to German Standard Specification No. 53,193 of from about 2.5 to 2.7, the spherical quartz particles being preferably situated between the platelet-shaped particles of kaolinite.

It is advantageous to use as corundum powder (c) one having an average particle size of less than 25 $\mu$, preferably from 2 to 12 $\mu$.

Suitable non-magnetic pulverulent mixtures according to the invention consist for example of 10 to 25 parts by weight of conductive carbon powder and 75 to 90 parts by weight of mixture (b) or 10 to 40 parts, preferably 15 to 20 parts, by weight of conductive carbon powder, 40 to 85 parts, preferably 40 to 60 parts, by weight of mixture (b) and 5 to 40 parts, preferably 30 to 40 parts, by weight of corundum powder having spherical particles. Although the ratio of the amount of the non-magnetic pulverulent mixture to the amount of binder in the backcoating (B) can be varied within wide limits depending on the intended application, a binder content of 20 to 50% by weight has proved advantageous. It is advantageous to so select the amount of carbon powder in the non-magnetic mixture that the resulting backcoating has a resistivity of less than $5 \times 10^8$, preferably less than $10^5$ ohms, per square.

The ratio of the amount of the non-magnetic pulverulent mixture to the amount of binder in the backcoating (B) is determined to a certain extent by the type of polymeric binder used. Suitable binders can be readily selected by the skilled worker in a few simple experiments from among those usually used in the manufacture of magnetic coatings. Copolymers derived from predominant amounts of vinyl chloride or vinylidene chloride and comonomers such as vinyl esters or acrylic esters, e.g. vinyl acetate, ethyl acrylate, ethyl methacrylate, butyl acrylate or butyl methoacrylate, are suitable, as are polyamides, mixtures of polyisocyanates and relatively high molecular weight hydroxyl compounds, and combination of butylated melamine-formaldehyde precondensates with polyvinyl acetals such as polyvinyl butyral. Examples of very suitable copolymers are copolymers prepared from major amounts of vinyl chloride and minor amounts of vinyl acetate, some of the acetate groups, e.g. 3 to 8% by weight, having been hydrolyzed, and copolymers derived from 70 to 92% of vinylidene chloride and 8 to 30% of, for example, acrylonitrile, methacrylonitrile, acrylic esters or methacrylic esters. Also suitable are copolymers of acrylonitrile and butadiene, preferably in admixture with binders which give relatively hard coatings; and polyepoxide compounds, particularly polyglycidyl ethers of polyhydric hydroxyl compounds, such as 2,2-bis(p-hydroxyphenyl)-propane, glycerol, 1,4-butanediol or pentaerythritol.

The binder used in the backcoating (B) should contain 10 to 60%, preferably 30 to 52% by weight of an elastomeric polyurethane. It is preferred to use as binder a soluble reaction product of a hydroxyl-containing linear polyester prepared from an aliphatic diol of 2 to 6 carbon atoms, an aliphatic dicarboxylic acid of 2 to 12 carbon atoms and an optional aliphatic hydroxycarboxylic acid or lactone thereof of 3 to 12 carbon atoms, with such an amount of a diisocyanate that all isocyanate groups can react with a hydroxyl group of the polyester. Highly suitable are the elastomeric and thermoplastic reaction products of (a1) hydroxyl-containing thermoplastic polyesters of adipic acid and 1,4-butanediol and/or ethylene glycol and (a2) diisocyanates, particularly 4,4'-diisocyanatodiphenylmethane, 4,4'-diisocyanatodiphenylpropane-(2,2), 4,4'-diisocyanatodicyclohexylmethane, 4,4'-diisocyanatodicyclohexylpropane-(2,2), 1,5-naphthylene diisocyanate or toluylene diisocyanate. In an advantageous method of carrying out the reaction the hydroxyl-containing polyester is reacted with about one half to three fourths of the equivalent amount of diisocyanate, based on the free hydroxyl groups of the polyester, in the presence of solvents. Preferred polyurethanes are then practically free from reactive isocyanate groups and have a high elongation at break (about 400 to 700%), a Shore hardness A of about 60 to 100 and a number average molecular weight of from about 10,000 to 60,000. Preferred polyurethanes are soluble in organic solvents such as tetrahydrofuran, tetrahydrofuran-toluene mixtures, dioxane, cyclohexanone, dimethyl formamide, some of them also being soluble in ketones such as methyl ethyl ketone and acetone. The said elastomeric polyurethanes can be used with particular advantage in admixture with binders based on vinyl chloride/vinyl acetate copolymers.

Thicknesses of from 7 to 13 $\mu$, particularly 9 to 11 $\mu$, for the backcoating (B) have proved to be advantageous. The back surface of the non-magnetic support can be provided with the backcoating in a conventional manner. Suitable non-magnetic substrate materials (S) are those usually used in the production of magnetic cards, such as polyvinyl chloride and polyester films more than 0.015 cm in thickness. The magnetic coating can be prepared in a conventional manner from a typical particulate magnetic pigment and a polymeric binder such as one of those mentioned above, and applied to the non-magnetic support in a conventional manner.

As compared with conventional backcoatings, the backcoatings of the invention are smoother and more abrasion resistant and exhibit better adhesion to the support and improved scratch resistance. Their favorable resistivity and good frictional characteristics should also be emphasized.

The invention is further illustrated by the following Examples. The parts and percentages given in the Examples and comparative Experiments are by weight unless otherwise stated.

EXAMPLE 1

Magnetic cards measuring 82 × 186 mm and comprising a 90 $\mu$ polyester film, a magnetic coating 12 $\mu$ in thickness prepared from a polyurethane binder and acicular $\gamma$-$Fe_2O_3$ and a backcoating (B) 10 $\mu$ in thickness were produced in a conventional manner. The backcoating had the following composition:

12.2% of a commercially available, tetrahydrofuran-soluble polyester urethane having a Shore hardness A of 78 and prepared from a polyester of butanediol-1,4 and adipic acid and 4,4'-diisocyanatodiphenylmethane;

18.7% of a commercially available copolymer containing about 91% of vinyl chloride units, 3% of vinyl acetate units and 6% of vinyl alcohol units;

7.4% of a commercially available copolymer of butadiene and acrylonitrile (Hycar 1432 manufactured by B. F. Goodrich);

5% of lecithin;

9.3% of conductive carbon (Corax 6 manufactured by Degussa);

27.8% of a mixture of 24 to 31% of kaolinite powder having platelet-shaped particles and 69 to 76% of quartz powder having spherical particles, the said mixture having the structure of a loose layered arrangement and a density according to German Standard specification No. 53,193 of from about 2.5 to 2.7 and the quartz particles being located between the platelet-shaped kaolinite particles; and 19.6% of fused alumina powder having a particle size of 3 to 9 $\mu$.

The content of the pulverulent mixture of kaolinite and quartz in the backcoating was 56.7%.

COMPARATIVE EXPERIMENT 1

Magnetic cards were produced in exactly the same way as in Example 1 except that backcoating (B) contained, as pulverulent mixture, 18.4% of the conductive carbon used in Example 1 and 37.8% of $\alpha$-$Fe_2O_3$ having an internal surface area of 20 m$^2$/g. The content of pulverulent mixture in the backcoating was the same as in Example 1.

TESTING OF THE MAGNETIC CARDS OF EXAMPLE 1 AND COMPARATIVE EXPERIMENT 1

The surface roughness (center line average value $R_a$) of the backcoating was measured using a Perth-O-Meter manufactured by Fa. Perthen, Hanover, Germany.

Scratch resistance was determined by drawing a stylus with a sapphire tip 50 $\mu$ in diameter over the backcoating under a load of 200 g, the depth of the resulting groove being measured in $\mu$ with the above apparatus.

Adhesion of the backcoating to the non-magnetic support was tested in the following manner:

A knife was drawn across the backcoating and a piece of adhesive tape was stuck over the cut. The piece of adhesive tape was then pulled off with a sharp jerk.

Good and poor adherence can be readily distinguished in this way.

The durability of the backcoatings was determined with the aid of a write and read apparatus marketed by IBM (Model MC 72). The magnetic cards were recorded and then read 100 times. Transportation through the apparatus resulted in the backcoatings being scratched to a greater or lesser extent.

Abrasion resistance was determined with the aid of a Taber Abrader (manufactured by Taber, North Tonawanda, N.Y., U.S.A. CS10 wheel, 250 g/wheel, 1000 revs), the weight loss being measured in mg.

The results of the foregoing tests are given in Table 1. It can be seen that the backcoating of Example 1, i.e.

according to the invention, is smoother, more scratch resistant, more abrasion resistant and adheres better to the substrate than the comparison product.

TABLE 1

| Backcoating of | Example 1 | Comp. Experiment 1 |
|---|---|---|
| Surface roughness ($\mu$) | 0.19 | 0.23 |
| Scratch resistance (depth of groove) ($\mu$) | 4.0 | 4.5 |
| Adhesion | good | poor |
| Durability | slight scratching | distinct scratching |
| Weight loss (mg) | 4.0 | 6.5 |

EXAMPLE 2

Magnetic cards were produced as described in Example 1 except that the backcoating (B) had the following composition:

8.0% of a commercially available copolymer containing 91% of vinyl chloride units, 3% of vinyl acetate units and 6% of vinyl alcohol units;

8.0% of a copolymer derived from 85% of vinylidene chloride and 15% of acrylonitrile;

3.9% of a commerically available high molecular weight condensation product of bisphenol A and epichlorohydrin having a molecular weight of about 30,000;

21.0% of the elastomeric polyurethane used in Example 1;

2.9% of lecithin;

9.2% of conductive carbon;

27.5% of the pulverulent mixture of kaolinite and quartz used in Example 1; and 19.5% of fused alumina powder having a particle size of 3 to 9 $\mu$.

EXAMPLE 3

Magnetic cards were produced as described in Example 1 except that the backcoating (B) had the following composition:

11.0% of conductive carbon;

62.8% of the pulverulent mixture of kaolinite and quartz used in Example 1;

1.5% of lecithin;

7.4% of a commercially available copolymer containing 91% of vinyl chloride units, 3% of vinyl acetate units and 6% of vinyl alcohol units;

4.9% of a commercially available high molecular weight condensation product of bisphenol A and epichlorohydrin having a molecular weight of about 30,000; and 12.4% of the polyurethane used in Example 1.

COMPARATIVE EXPERIMENT 2

Magnetic cards were produced as described in Example 1, the backcoating (B) having the same composition as in Example 2 except that there was used, as pulverulent mixture, a mixture of 18.4% of conductive carbon and 37.8% of $\alpha$-$Fe_2O_3$ having an internal surface area of 20 m$^2$/g instead of the mixture of conductive carbon, kaolinite powder, quartz powder and fused alumina powder.

TESTING OF THE MAGNETIC CARDS OF EXAMPLES 2 AND 3 AND COMPARATIVE EXPERIMENT 2

In addition to the adhesion and durability tests described in Example 1, the resistivity and the coefficients of friction ($C_m$, $C_r$, $C_s$) defined at the beginning of the specification were determined.

The results obtained are given in Table 2. It can be seen that the backcoatings (B) of Examples 2 and 3, i.e. according to the invention, are superior to the comparison product with regard to adhesion, resistivity and coefficient of friction ($C_m$).

TABLE 2

| Backcoating of | Example 2 | Example 3 | Comp. Experiment 2 |
|---|---|---|---|
| Adhesion | good | good | marked separation |
| Durability | slight scratching | slight scratching | slight scratching |
| Resistivity (ohms per square) | $10^3$ | not measured | $3.5 \times 10^3$ |
| Coefficient of friction: | | | |
| $C_r$ (desired value) 0.90 or more | 1.03 | 0.90 | 0.95 |
| $C_s$ (desired value) 0.35 or less | 0.35 | 0.35 | 0.33 |
| $C_m$ (desired value) 0.50 or less | 0.46 | 0.50 | 0.62 |

We claim:

1. A magnetic recording medium in card form comprising a flat non-magnetic support, a magnetic coating on one side of the support and a backcoating comprising polymeric binder, conductive particles and non-magnetic pigments on the opposite side of the support, wherein the said backcoating consists essentially of
   i. 20 to 50% by weight of a binder containing 10 to 60% by weight of an elastomeric flexible polyurethane substantially free of isocyanate groups, and
   ii. a non-magnetic pulverulent mixture of 10 to 40 parts by weight of conductive carbon powder (a), 40 to 90 parts by weight of an intimate mixture (b) of 20 to 45% by weight of kaolinite powder having platelet-shaped particles and 55 to 80% by weight of quartz powder having spherical particles, and optionally 5 to 40 parts by weight of corundum powder (c) having spherical particles the coefficient of friction ($C_m$) between the back surface of a card and the magnetized surface of an adjacent card being less than 0.50.

2. A magnetic recording medium as set forth in claim 1 wherein the non-magnetic pulverulent mixture consists of 10 to 25 parts by weight of carbon black powder (a) and 75 to 90 parts by weight of mixture (b).

3. A magnetic recording medium as set forth in claim 1 wherein the non-magnetic pulverulent mixture consists of 10 to 40 parts by weight of conductive carbon powder (a), 40 to 85 parts by weight of mixture (b) and 5 to 40 parts by weight of corundum powder (c).

4. A magnetic recording media as set forth in claim 1 in which said backcoating has a thickness of from 7 to 13 $\mu$.

5. A magnetic recording media as set forth in claim 1 in which said backcoating has a thickness of from 9 to 11 $\mu$.

* * * * *